United States Patent
Sudo et al.

(10) Patent No.: US 11,858,418 B2
(45) Date of Patent: Jan. 2, 2024

(54) SYSTEM FOR GENERATING PSEUDO DRIVING SOUND

(71) Applicant: Latido Co., Ltd., Osaka (JP)

(72) Inventors: Yoshihiro Sudo, Osaka (JP); Yoshinori Matsumoto, Osaka (JP); Taklam Li, Osaka (JP)

(73) Assignee: CRAFTS & MEISTER CO., LTD, Osaka (JP)

( * ) Notice: Subject to any disclaimer, the term of this patent is extended or adjusted under 35 U.S.C. 154(b) by 520 days.

(21) Appl. No.: 17/117,851

(22) Filed: Dec. 10, 2020

(65) Prior Publication Data
US 2022/0185178 A1    Jun. 16, 2022

(51) Int. Cl.
| | |
|---|---|
| *G10K 15/04* | (2006.01) |
| *B60Q 5/00* | (2006.01) |
| *B60K 35/00* | (2006.01) |
| *B60W 50/14* | (2020.01) |

(52) U.S. Cl.
CPC .............. *B60Q 5/008* (2013.01); *B60K 35/00* (2013.01); *B60W 50/14* (2013.01); *G10K 15/04* (2013.01); *B60K 2370/157* (2019.05); *B60K 2370/167* (2019.05); *B60W 2555/20* (2020.02)

(58) Field of Classification Search
CPC ...... B60Q 5/008; B60Q 9/00; B60Q 2900/50; B60K 35/00; B60K 2370/157; B60K 2370/167; B60K 2370/592; B60W 50/14; B60W 2555/20; G10K 15/04; G10K 15/02
See application file for complete search history.

(56) References Cited

U.S. PATENT DOCUMENTS

| | | | |
|---|---|---|---|
| 10,133,540 B2 * | 11/2018 | Kwon | G05B 15/02 |
| 10,841,698 B1 * | 11/2020 | Janampally | G10L 25/51 |
| 2005/0232432 A1 * | 10/2005 | Yasushi | B60Q 5/008 |
| | | | 381/86 |
| 2010/0208915 A1 * | 8/2010 | Lipp | H04R 5/02 |
| | | | 381/86 |
| 2017/0123754 A1 * | 5/2017 | Kwon | G10K 15/02 |
| 2021/0304729 A1 * | 9/2021 | Noguchi | H04S 7/302 |

FOREIGN PATENT DOCUMENTS

JP      2004357487 A  * 12/2004    ............... B60Q 5/00

* cited by examiner

*Primary Examiner* — Oyesola C Ojo
(74) *Attorney, Agent, or Firm* — Simpson & Simpson, PLLC; S. Peter Konzel (57) ABSTRACT

A pseudo driving sound playback system includes a server and an in-vehicle device. The server includes a database of pseudo sound data sets in which sound elements of engine sound are associated with each of a plurality of predefined driving states for each of a plurality of passenger gasoline vehicle models. The in-vehicle device determines one of a plurality of vehicle models based on received input of a user, downloads a pseudo sound data set of the vehicle model from the server, selects a sound element according to the detected driving state from the pseudo sound data set, and sequentially outputs the sound element as sound from a speaker.

13 Claims, 10 Drawing Sheets

| VEHICLE MODEL ID | VEHICLE MODEL NAME | PSEUDO SOUND DATA SET |
|---|---|---|
| 0001 | A | SOUND SET AAA |
| 0002 | B | SOUND SET BBB |
| 0003 | C | SOUND SET CCC |
| ... | ... | ... |

FIG.6

PSEUDO SOUND DATA SET TABLE

| SPEED | ACCELERATION | INCLINATION ANGLE | SOUND ELEMENT DATA |
|---|---|---|---|
| 0 km/h | — | — | 000-001 |
| ... | ... | ... | ... |
| 30 km/h | 20 ~ 30 m/s$^2$ | 5° | 030-028 |
| ... | ... | ... | ... |
| 80 km/h | 0 ~ 5 m/s$^2$ | −1° ~ 1° | 080-018 |
| ... | ... | ... | ... |

FIG.7

VIRTUAL ENVIRONMENTAL SOUND TABLE

| SPEED | ACCELERATION | INCLINATION ANGLE | PSEUDO SOUND DATA |
|---|---|---|---|
| 0 km/h | — | — | E000-001 |
| ... | ... | ... | ... |
| 30 km/h | 20 ~ 30 m/s$^2$ | 5° | E030-028 |
| ... | ... | ... | ... |
| 80 km/h | 0 ~ 5 m/s$^2$ | -1° ~ 1° | E080-018 |
| ... | ... | ... | ... |

FIG.8

BILLING TABLE

| USER ID | USER NAME | VEHICLE MODEL A | VEHICLE MODEL B | VEHICLE MODEL C | ... |
|---|---|---|---|---|---|
| ... | ... | ... | ... | ... | ... |
| 00020403 | AAAA | CHARGED | CHARGED | CHARGED | ... |
| 00020404 | BBBB | NOT CHARGED | CHARGED | CHARGED | ... |
| 00020405 | CCCC | CHARGED | NOT CHARGED | NOT CHARGED | ... |
| 00020406 | DDDD | NOT CHARGED | NOT CHARGED | CHARGED | ... |
| ... | ... | ... | ... | ... | ... |

FIG.9

SYSTEM FOR GENERATING PSEUDO DRIVING SOUND

BACKGROUND OF THE INVENTION

1. Field of the Invention

The present invention relates to a pseudo driving sound playback system which generates driving sound of a specific passenger gasoline vehicle to the inside of a vehicle in a pseudo manner.

2. Description of Related Art

In a recent year, for example, US Patent Publication No. 2018/0090125 discloses a configuration for allowing pedestrians around an electric vehicle and users of an electric vehicle to experience driving sounds such as engine sound, gear shift and throttle sound. The pseudo played driving sound is configured to correspond to operations of the electric vehicle such as acceleration, speed, and gear shift.

However, in the above-described related arts, since the driving sound generated in a pseudo manner is output to the outside, it is essential that the driving sound accurately corresponds to the driving state of the electric vehicle. Therefore, it is necessary to require high accuracy in detecting the driving state and the configuration for that purpose may cause an influence on the price of the car.

Furthermore, some users who drive a car prefer not only driving but also driving sound. It is common for such users to experience multiple vehicle models, but the number of users who have the opportunity to experience such experiences is limited.

SUMMARY OF THE INVENTION

Therefore, an object of the invention is to provide a pseudo driving sound playback system capable of easily experiencing driving sounds of a plurality of vehicle models.

A pseudo driving sound playback system of the invention is a pseudo driving sound playback system including a server and an in-vehicle device, wherein
the server includes,
a database which stores a plurality of pseudo sound data sets in which sound elements of engine sound are associated with each of a plurality of predefined driving states for each of a plurality of passenger gasoline vehicle models,
the in-vehicle device, includes
a communication unit which performs data communication with the server,
a display unit,
an input unit which accepts input from a user,
a storage unit,
a detection unit which continuously detects the driving state of a passenger car equipped with the in-vehicle device,
a sound output unit which outputs the sound element to the inside of the passenger car, and
a controller, and
the controller
determines any one of the plurality of vehicle models based on the input of the user received by the input unit,
requests the determined vehicle model to the server via the communication unit,
downloads a pseudo sound data set corresponding to the vehicle model from the server as a response to the request and stores the pseudo sound data set in the storage unit, and
selects the sound element according to the driving state detected by the detection unit from the pseudo sound data set and sequentially outputs the sound element as sound from the sound output unit.

According to the configuration described above, the user simply selects a desired vehicle model from a plurality of passenger gasoline vehicle models, then the pseudo sound data set is automatically downloaded from the server and the sound elements according to the driving state are sequentially played in the vehicle. As a result, the user can easily experience the driving sounds of a plurality of vehicle models.

Further, in the pseudo driving sound playback system of the invention,
the controller may change standard of the sound element to be selected with respect to the detected driving state according to setting.

According to the configuration described above, the user can easily experience a high-speed driving sound.

Further, in the pseudo driving sound playback system of the invention,
the in-vehicle device further includes an environmental sound acquisition unit which acquires environmental sound generated outside the passenger car, and
the controller may output the environmental sound into the vehicle.

According to the configuration described above, the user can hear not only the pseudo played driving sound but also the environmental sound outside the vehicle while driving, so that the risk of an accident or the like can be reduced.

Further, in the pseudo driving sound playback system of the invention,
the controller generates virtual environmental sound corresponding to the detected driving state and outputs the virtual environmental sound to the inside of the vehicle.

According to the configuration described above, it is possible to play back a more natural driving sound.

Further, in the pseudo driving sound playback system of the invention,
the controller may switch on/off of output of the virtual environmental sound according to setting.

According to the configuration described above, it is possible to meet the desire of the user who wants to hear only the driving sound.

Further, in the pseudo driving sound playback system of the invention,
the controller may display an image imitating an in-vehicle device actually mounted on the determined vehicle model on the display unit after the vehicle model is determined.

According to the configuration described above, it is possible to further improve the immersive feeling of the user.

Further, in the pseudo driving sound playback system of the invention,
the controller may allow selection of the vehicle model by charging.

According to the configuration described above, the profit of the vendor providing the pseudo driving sound playback system can be improved.

Further, in the pseudo driving sound playback system of the invention, the controller may display a vehicle model selection screen in which vehicle model information is displayed for each of the plurality of vehicle models on the display unit, and after selecting the vehicle model, outputs advertisement information of the manufacturer of the vehicle model as an alternative to the charging.

According to the configuration described above, it can be used for royalties using driving sounds, images, and the like of the vehicle model.

DETAILED DESCRIPTION OF THE INVENTION

Hereinafter, an embodiment of the invention will be described with reference to the drawings.

(Configuration)

Figure 1:
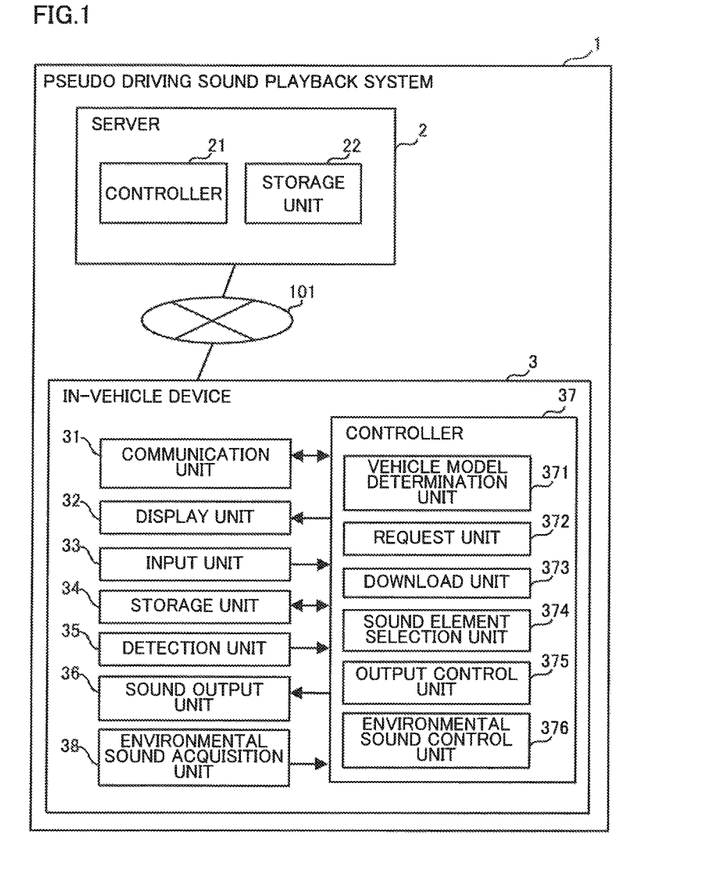
FIG. 1 is a block diagram of a pseudo driving sound playback system.

As illustrated in FIG. 1, a pseudo driving sound playback system 1 is configured to specify one from a plurality of vehicle models and play back the driving sound of the vehicle model in a pseudo manner in the vehicle. Specifically, the pseudo driving sound playback system 1 has a server 2 and an in-vehicle device 3.

The server 2 has a controller 21 and a storage unit 22. The server 2 has a database in the storage unit 22 that stores a plurality of pseudo sound data sets associated with each of a plurality of vehicle models of passenger gasoline vehicles. The controller 21 executes a process of responding to a request indicating the vehicle model with a pseudo sound data set corresponding to the vehicle model. Each pseudo sound data set is a data table in which sound elements are associated with each of a plurality of predefined driving states. The sound element is sound data associated with a vehicle model and a driving state.

The storage unit 22 stores various programs for the controller 21 to control each of the above units and various data used by the various programs. In other words, the various programs cause the in-vehicle device 3 operating as a computer to execute the processes of the various programs.

The server 2 is a computer and includes a Central Processing Unit (CPU), which is the main component of the controller 21, an Electrically Erasable and Programmable Read Only Memory (EEPROM) which can rewrite and store the programs executed by the CPU and the data used for these programs, and a Random Access Memory (RAM) which temporarily stores data when the program is executed.

The server 2 is not limited to one computer and may be provided by distributing the functions to a plurality of computers.

The in-vehicle device 3 includes a communication unit 31 which performs data communication with the server 2 via a communication line 101, a display unit 32 which displays a plurality of vehicle models in a selectable manner, an input unit 33 which accepts input from a user, a storage unit 34, a detection unit 35 which continuously detects the driving state of a passenger car on which the in-vehicle device 3 is mounted, a sound output unit 36 which outputs the sound element of the pseudo sound data set to the inside of the passenger car, an environmental sound acquisition unit 38 which acquires environmental sound outside the vehicle, and a controller 37 which controls each of these units.

The communication unit 31 is an interface for performing data communication using a communication network such as the Internet. The display unit 32 is, for example, a display of a terminal device such as a tablet computer and a smartphone, or a car navigation device mounted on a passenger car to which the pseudo driving sound playback system 1 is applied and has a function of presenting a plurality of vehicle models. For example, a vehicle model selection screen in which vehicle model information is displayed for each of the plurality of vehicle models is displayed. The display unit 32 may present a plurality of vehicle models by voice instead of the display unit 32.

The input unit 33 is, for example, an input device such as the terminal device, a touch panel in the car navigation device, a mouse, a keyboard, a microphone, and a camera and has a function of receiving an input for selecting one desired by a user from a plurality of vehicle models. The input unit 33 is not limited to accepting the user's touch operation and may accept the user's voice or gesture.

The in-vehicle device 3 includes a computer and includes a CPU, which is the main component of the controller 37, an EEPROM which can rewrite and store the programs executed by the CPU and the data used by these programs, and a RAM which temporarily stores data when the program is executed.

The storage unit 34 is a non-transitory recording medium which can be read by a computer and is composed of the storage device described above. Also, the storage unit 34 stores various programs for the controller 37 to control each of the above units and various data used by the various programs. In other words, the various programs cause the in-vehicle device 3 operating as a computer to execute the processes of the various programs. These various programs and various programs are stored, for example, by installing an application on a terminal device. The storage unit 34 stores, for example, the pseudo sound data set downloaded from the server 2.

The detection unit 35 is one or more sensors having a function of detecting the driving state of a passenger car equipped with the in-vehicle device. For example, the detection unit 35 is any one or more of a speed sensor which detects the speed of a passenger car as a driving state, an accelerometer which detects the acceleration of a passenger car as a driving state, an inclined angle sensor which detects the inclination of the road as the driving state of a passenger car, and the like. For example, the speed sensor may be a GPS device or a time measuring device provided in a terminal device or a car navigation device and the speed may be detected by these devices. Further, for example, the speed sensor may be a sensor which detects the inclination of an accelerator pedal and may detect the speed based on the inclination of the accelerator pedal. The various sensors are not limited to these and known ones can be applied.

The sound output unit 36 is, for example, a speaker installed in a passenger car, a speaker of a terminal device, or the like. The environmental sound acquisition unit 38 has a function of acquiring a sound generated outside the passenger car. The environmental sound acquisition unit 38 is, for example, a microphone device provided outside the passenger car.

The controller 37 has a vehicle model determination unit 371, a request unit 372, a download unit 373, a sound element selection unit 374, and an output control unit 375. The vehicle model determination unit 371 has a function of determining any one of a plurality of vehicle models based on the input of a user received by the input unit 33. The determination of the vehicle model may be permitted by the user's charge. That is, when the vehicle model selected by a user is not charged, the vehicle model determination unit 371 may output, to the display unit 32 or the sound output unit 36, that the vehicle model cannot be selected because it has not been charged, that payment is required, and a charging screen or the like. This can improve the profits of vendors who provide pseudo driving sound playback systems. Further, the controller 37 may control the advertisement of the manufacturer of the vehicle model selected by a user to be output to the display unit 32 or the sound output unit 36 at a predetermined time as an alternative to the charge. As a result, it is possible to allocate royalties for using the driving sounds, the images, and the like of the vehicle model. Further, the vehicle model determination unit 371 may display an image imitating an in-vehicle device such as a tachometer actually mounted on the determined vehicle model on the display unit 32 after the vehicle model is determined. This makes it possible to further improve the immersive feeling of a user. In the embodiment, the advertisement is not presented due to charging, but the embodiment is not limited to this. For example, the vehicle model may be selected only by charging. Further, for example, there may be a mode in which all vehicle models can be selected without charging or presenting an advertisement.

The request unit 372 has a function of requesting the vehicle model determined by the vehicle model determination unit 371 to the server 2 via the communication unit 31. When the pseudo sound data set corresponding to the vehicle model determined by the vehicle model determination unit 371 is already stored in the storage unit 34, the request may be canceled. The download unit 373 has a function of downloading the pseudo sound data set corresponding to the vehicle model from the server 2 and storing pseudo sound data set in the storage unit 34 as a response to the request.

The sound element selection unit 374 has a function of selecting a sound element according to the driving state detected by the detection unit 35 from the pseudo sound data set. The sound element selection unit 374 may change the standard for selecting the sound element according to the setting. For example, the sound element selection unit 374 may switch the sound element to be selected from the sound element of 50 km/h, the sound element of 75 km/h (corresponds to 1.5 times the detected speed), and the sound element of 100 km/h (corresponds to twice the detected speed) according to the setting when the speed of the passenger car is 50 km/h. As described above, the sound element selection unit 374 may change the standard of the sound element to be selected with respect to the detected driving state according to the setting. This allows a user to easily experience a high-speed driving sound. It is preferable that the sound element to be selected corresponds to a driving state in which the speed or acceleration is higher than those of the detected driving state. This makes it possible for a user to reduce the illusion that the speed or acceleration is lower than the actual driving state in which the user is driving. In this embodiment, the reference value can be finely set by a slider bar in a range where the minimum value is 1× and the maximum value is 2× on the setting screen (see FIG. 3).

The output control unit 375 has a function of sequentially outputting the sound elements selected by the sound element selection unit 374 as sound from the sound output unit 36. The output control unit 375 perform control for continuously outputting the currently selected sound element until the next sound element is selected, and switching to the output of the next sound element when the next sound element is selected.

Further, the controller 37 has an environmental sound control unit 376. The environmental sound control unit 376 has a function of outputting to the inside of the vehicle via the sound output unit 36 based on the environmental sound generated outside the vehicle acquired by the environmental sound acquisition unit 38. The environmental sound control unit 376 may output the environmental sound generated outside the vehicle acquired by the environmental sound acquisition unit 38 as it is, or the environmental sound control unit 376 may extract only sound waves having a volume equal to or higher than a predetermined value, for example, sirens of emergency vehicles such as ambulances, fire engines, and police cars, sounds generated by large vehicles, and sound waves such as accidents between vehicles and output the sound waves into the vehicle. Further, when only sound waves having a volume equal to or higher than a predetermined value are output into the vehicle, the volume of the output sound element may be lowered or the output of the sound element may be omitted. Known methods can be applied to the extraction of sound waves.

Further, the environmental sound control unit 376 may generate virtual environmental sound based on the driving state detected by the detection unit 35 and output the virtual environmental sound from the sound output unit 36. Examples of the virtual environmental sound include wind noise, tire running sound, and brake noise. This makes it possible to play back a more natural driving sound. For the virtual environmental sound, a plurality of sound data associated with each of the plurality of driving states are downloaded from the server 2 and stored in the storage unit 34. The output of the virtual environmental sound is preferably turned on/off according to the user's setting. This makes it possible to meet the desire of the user who wants to hear only the driving sound. In the embodiment, on/off can be set for each of the wind noise, the tire running sound, and the brake noise (see FIG. 3). That is, the environmental sound data individually includes the sound data of the wind noise, the tire running sound, and the brake noise and only the environmental sound that is turned on is configured so that the data corresponding to the driving state is extracted and output as sound.

As described above, the pseudo driving sound playback system 1 is the pseudo driving sound playback system 1 having the server 2 and the in-vehicle device 3. The server 2 has a database which stores a plurality of pseudo sound data sets in which the sound elements of the engine sound are associated with each of a plurality of predefined driving states for each of a plurality of passenger gasoline vehicle models. The in-vehicle device 3 includes the communication unit 31 which performs data communication with the server 2, the input unit 33 which accepts input from a user, the storage unit 34, the detection unit 35 which continuously detects the driving state of the passenger car equipped with the in-vehicle device 3, the sound output unit 36 which outputs sound elements to the inside of the passenger car, and the controller 37. Then, the controller 37 determines any one of the plurality of vehicle models based on the input of the user received by the input unit 33 and requests the determined vehicle model to the server 2 via the communication unit 31. Next, as a response to the request, the controller 37 downloads the pseudo sound data set corresponding to the vehicle model from the server 2 and stores the pseudo sound data set in the storage unit 34. Then, the controller 37 selects a sound element according to the driving state detected by the detection unit 35 from the pseudo sound data set and sequentially outputs the sound element as sound from the speaker.

According to the configuration described above, the user simply selects a desired vehicle model from a plurality of passenger gasoline vehicle models and the pseudo sound data set is automatically downloaded from the server 2, and then the sound elements according to the driving state are sequentially played back in the vehicle. As a result, the user can easily experience the driving sounds of a plurality of vehicle models.

(Display Mode of Display Unit 32 in In-Vehicle Device 3)

Figure 2:
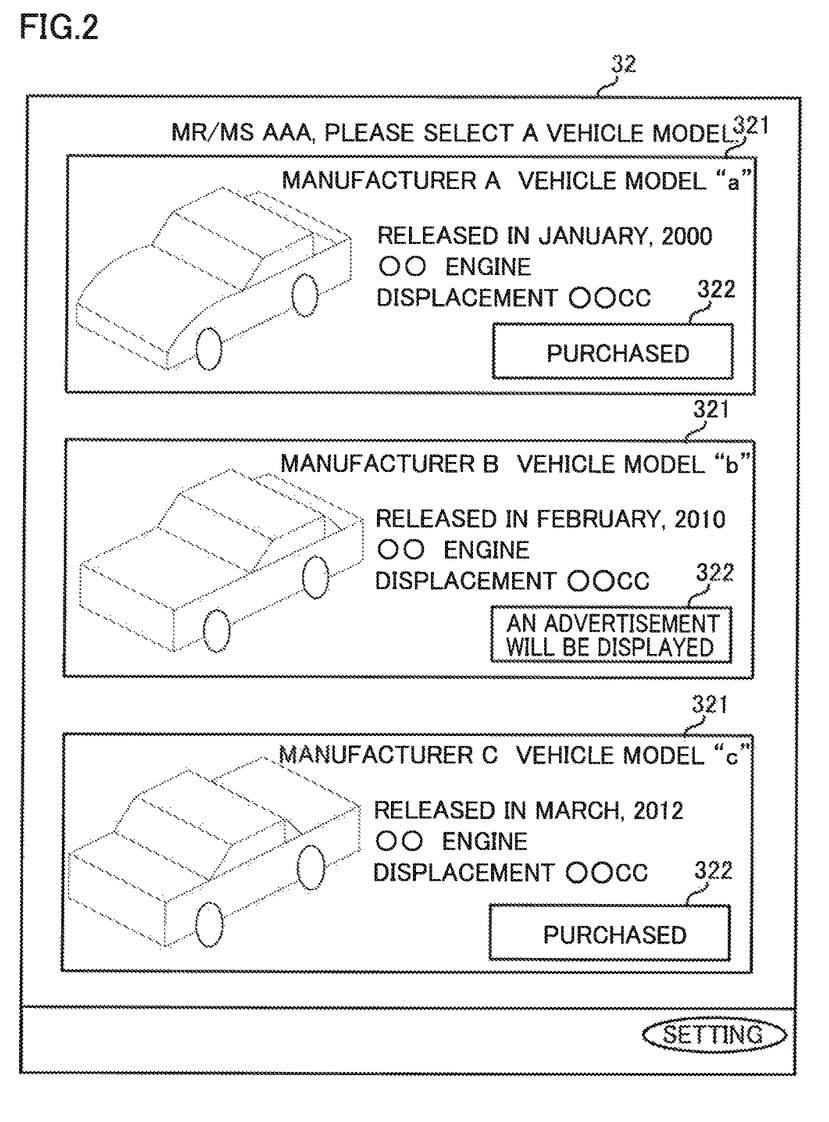
FIG. 2 is an explanatory diagram illustrating an example of a display mode of a vehicle model selection screen.

Next, the display mode of the display unit 32 will be described.

First, an example of a vehicle model selection screen will be described with reference to FIG. 2. As illustrated in FIG. 2, the display unit 32 of the in-vehicle device 3 displays the vehicle model selection screen for selecting a vehicle model. On the vehicle model selection screen, vehicle model information 321 including manufacturer name information, vehicle model name information, vehicle model appearance image, and vehicle model detailed information (release date, engine, displacement, and the like) is displayed in a list for each vehicle model. In addition, purchase information 322 is displayed in the vehicle model information 321 and information on whether the vehicle model has been charged and purchased or has not been charged and is subject to advertisement presentation is displayed.

Figure 3:
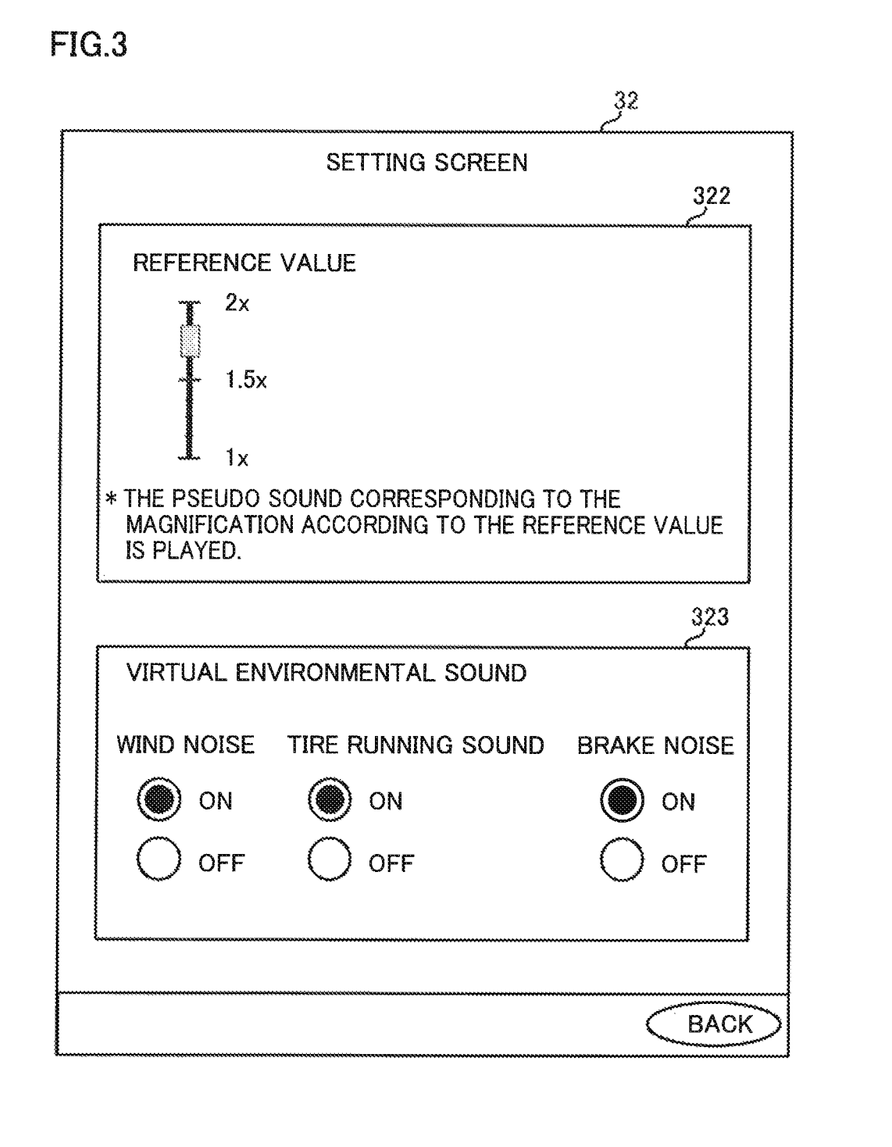
FIG. 3 is an explanatory diagram illustrating an example of a display mode of a setting screen.

Next, a setting screen transitioned from the vehicle model selection screen will be described with reference to FIG. 3. As illustrated in FIG. 3, on the setting screen, the reference value and the on/off of the virtual environmental sound can be set. The reference value is a criterion for selecting a sound element as described above. When the reference value is 1×, the sound selection reference is not changed, and thus, for example, when the speed of a passenger car is detected as 50 km/h, the sound element of 50 km/h is selected. Further, when the reference value is 1.5×, for example, if the speed of the passenger ear is detected as 50 km/h, the sound element of 75 km/h is selected. Further, when the reference value is 2×, for example, if the speed of the passenger car is detected as 50 km/h, the sound element of 100 km/h is selected. On/off of the virtual environmental sound is a setting of whether or not to output the virtual environmental sound.

Figure 4:
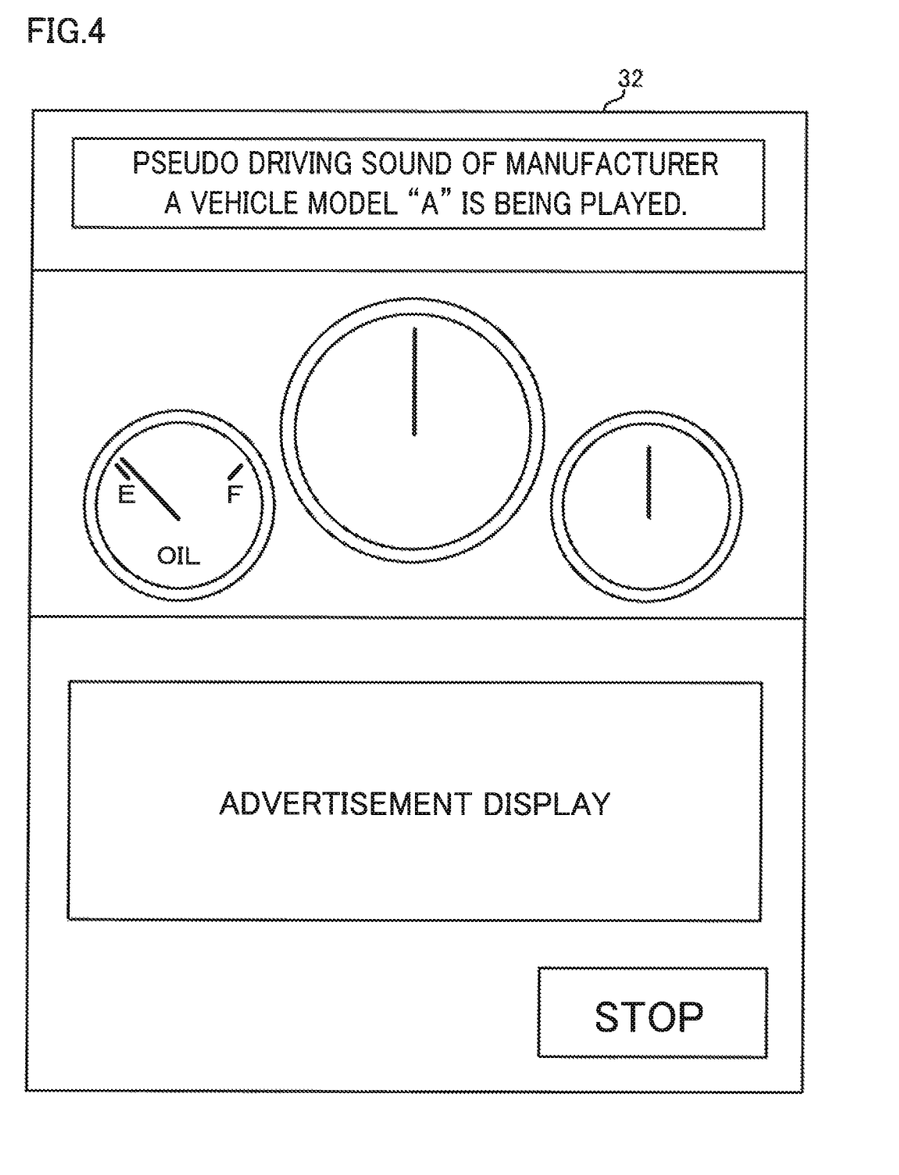
FIG. 4 is an explanatory diagram illustrating an example of a display mode of a pseudo sound playback screen.

Next, with reference to FIG. 4, a pseudo sound playback screen transitioned from the vehicle model selection screen will be described. The pseudo sound playback screen is a screen displayed on the display unit 32 when the pseudo sound is played back. As illustrated in FIG. 4, on the pseudo sound playback screen, an image of an in-vehicle device imitating an indicator such as a tachometer actually mounted on the selected vehicle model is displayed. For example, the image may be controlled so as to reduce the remaining amount of the displayed oil indicator according to the time and an advertisement may be output when the remaining amount becomes zero.

(Database on Server 2)

Figure 5:
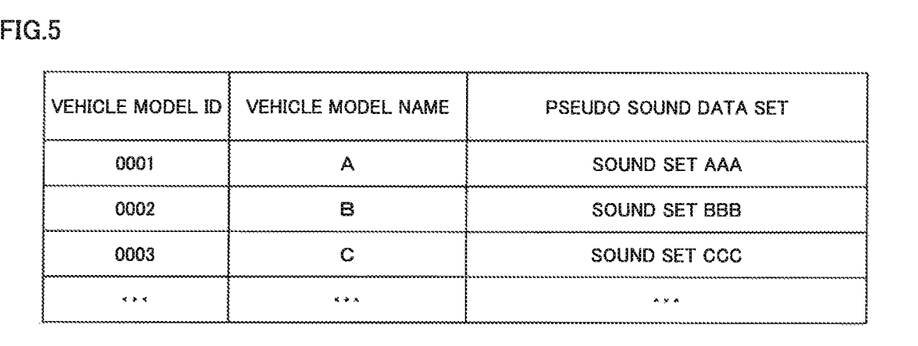
FIG. 5 is an explanatory diagram of a database of a server.

Next, a database stored in the storage unit 22 of the server 2 will be described with reference to FIG. 5. As illustrated in FIG. 5, the vehicle model name and the pseudo sound data set are stored in association with a vehicle model ID which identifies the vehicle model. In response to the request from the in-vehicle device 3, the server 2 responds with a pseudo sound data set corresponding to the vehicle model ID included in the request.

(Pseudo Sound Data Set Table)

Figure 6:
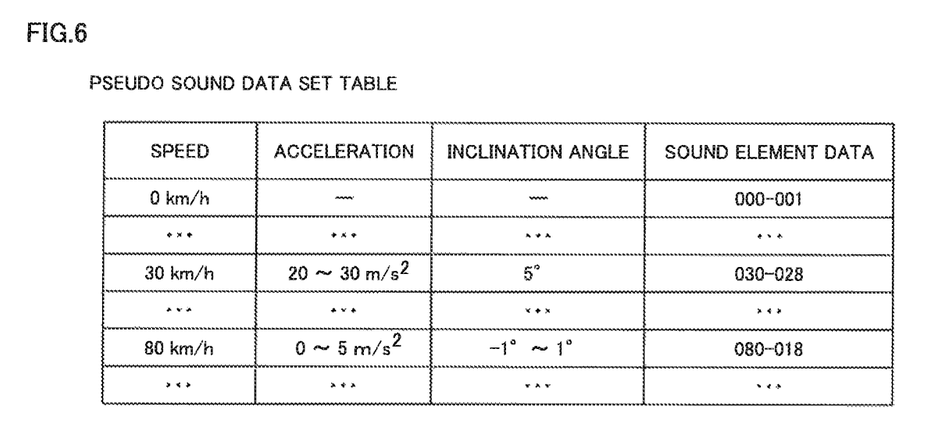
FIG. 6 is an explanatory diagram of a pseudo sound data set table.

The pseudo sound data set included in the database of the server 2 and stored in the storage unit 34 of the in-vehicle device 3 is a data table. As illustrated in FIG. 6, this pseudo sound data set table has a speed column, an acceleration column, and an inclination angle column as driving states and sound element data corresponding thereto is stored. For example, in the speed column, the acceleration column, and the inclination angle column, a signal value indicating the driving state which can be transmitted from the detection unit 35 and a range thereof are stored. When the controller 37 actually receives the signal of the driving state from the detection unit 35, the pseudo sound data set table is referred to as a look-up table by the signal value and the sound element to be output is extracted. When the standard of the selected sound element is changed, the signal value indicating the driving state is converted by a conversion table (not illustrated), and then the pseudo sound data set table is referred to. For example, when the reference value is 1.5× and the detected speed is 50 km/h, it is converted into a signal of 75 km and the pseudo sound data set table is referred to. Such a pseudo sound data set table is stored in the storage unit 22 of the server 2 in advance for each vehicle model and is downloaded to the in-vehicle device 3 as needed.

(Virtual Environmental Sound Table)

Figure 7:
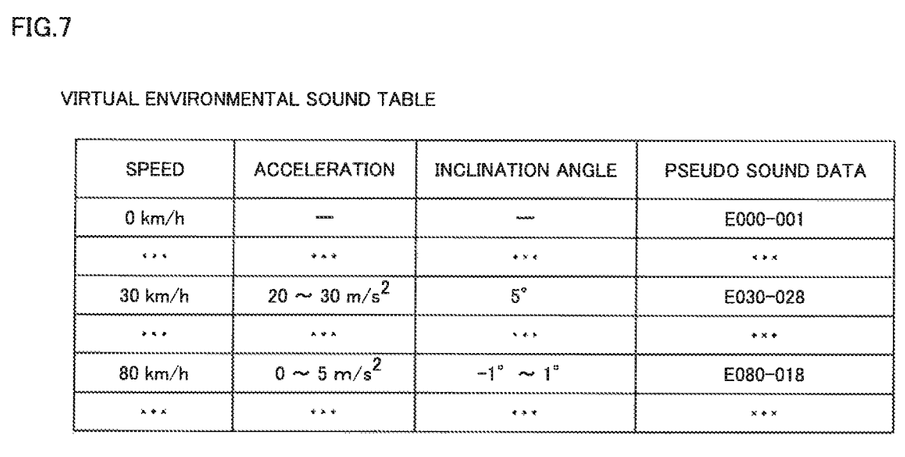
FIG. 7 is an explanatory diagram of a virtual environmental sound table.

Further, as illustrated in FIG. 7, the storage unit 22 of the server 2 stores a virtual environmental sound table for generating a virtual environmental sound. When the virtual environmental sound is turned on by the user's setting, the virtual environmental sound table is downloaded and used. Similar to the pseudo sound data set table, the virtual environmental sound table has a speed column, an acceleration column, and art inclination angle column as driving states and the corresponding environmental sound data is stored. When the controller 37 actually receives the signal of the driving state from the detection unit, the virtual environmental sound table is referred to as a look-up table by the signal value and the environmental sound data to be output is extracted. In the embodiment, the environmental sound data individually includes the sound data of the wind noise, the tire running sound, and the brake noise and the controller 37 extracts the data corresponding to the driving state from the turned-on environmental sound. Such a virtual environmental sound table is stored in the storage unit 22 of the server 2 in advance and is downloaded to the in-vehicle device 3 as needed.

(Billing Table)

Figure 8:
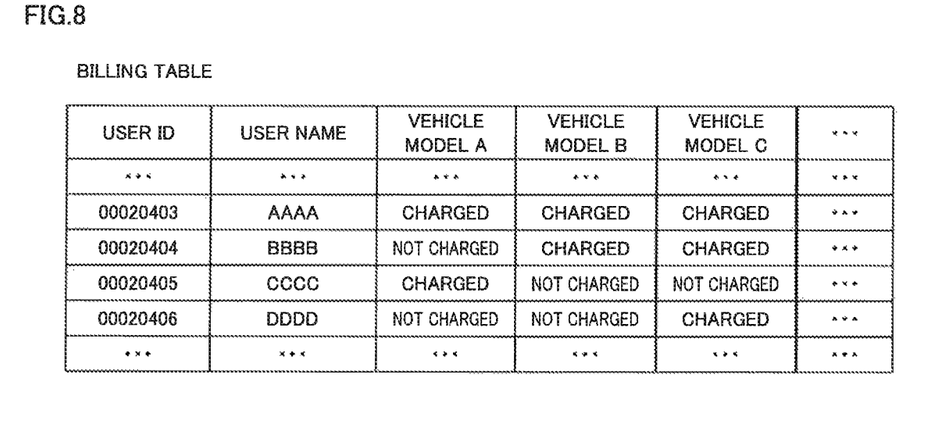
FIG. 8 is an explanatory diagram of a billing table.

Further, as illustrated in FIG. 8, the storage unit 22 of the server 2 stores a billing table in which the billing status for each vehicle model of a user is stored. The billing table has a user ID column for identifying a user, a user name column, and a plurality of vehicle model columns. For the user ID and user name, data indicating whether or not there is a charge for each vehicle model is stored. The server 2 refers to the billing table in response to the request when the in-vehicle device 3 displays the vehicle model selection screen and responds with the above data of the user who made the request together with the vehicle model information for each vehicle model.

(Flowchart)

Figure 9:
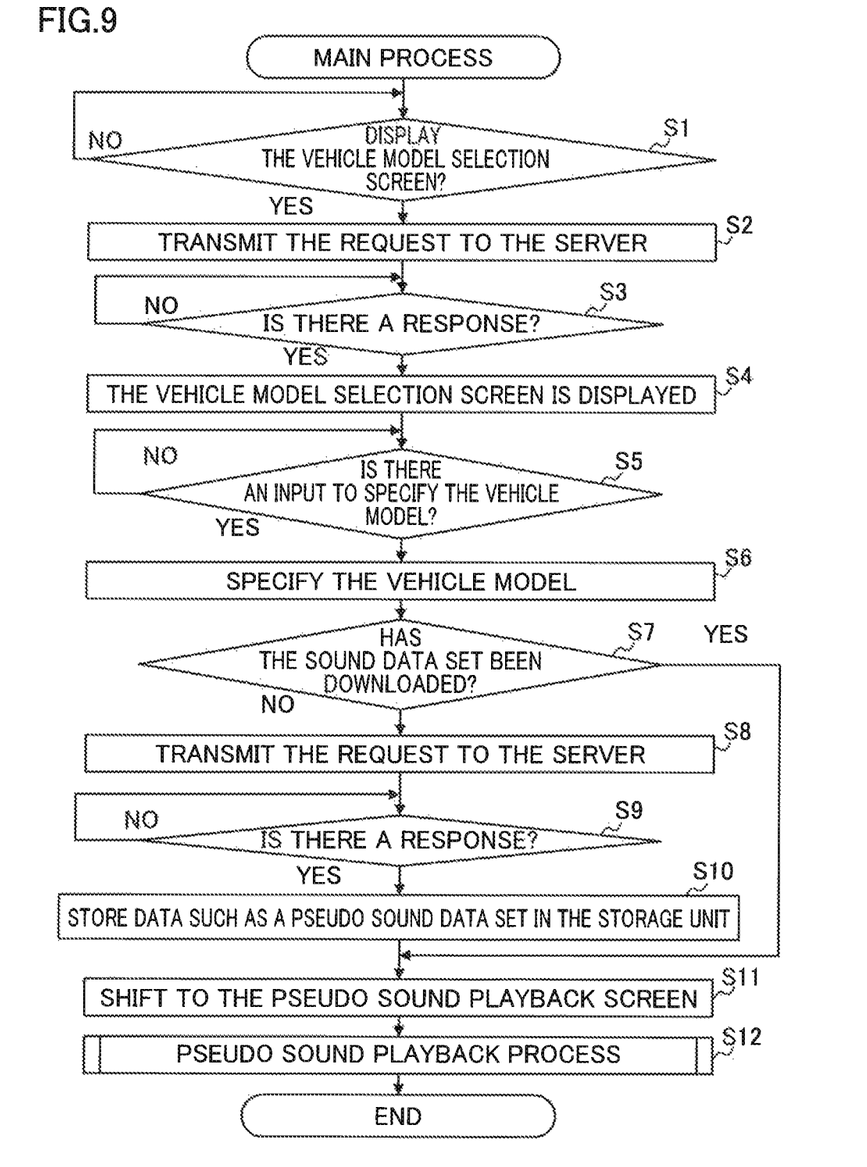
FIG. 9 is a flowchart of a main process.

Next, with reference to FIG. 9, a flowchart of the main process will be described as an example of the operation executed by the controller 37 of the in-vehicle device 3. First, the controller 37 determines whether or not the display of the vehicle model selection screen is requested by, for example, a user activating an application of a terminal device or the like (S1). When the display of the vehicle model selection screen is not requested (S1: NO), the controller 37 repeats Step S1 and enters the standby state.

On the other hand, when the display of the vehicle model selection screen is requested (S1: YES), the controller 37 transmits the request for the vehicle model selection screen to the server 2 (S2). This request includes a user ID. Then, the controller 37 determines whether or not there is a response from the server 2 (S3). When there is no response from the server 2 (S3: NO), Step S3 is repeated and the standby state is set. On the other hand, when there is a response from the server 2 (S3: YES), the controller 37 generates a vehicle model selection screen (see FIG. 4) based on the billing status and vehicle model information for each vehicle model included in the response and outputs the screen to the display unit 32 (54).

Then, the controller 37 determines whether or not there is an input from the user to specify the vehicle model (S5). When there is no input from the user to specify the vehicle model (S5: NO), Step S5 is repeated and the standby state is set. On the other hand, when there is an input from the user to specify the vehicle model (S5: YES), the controller 37 specifies the vehicle model (S6). When the advertisement display is not provided as a substitute for the charge, the controller 37 may determine whether or not the vehicle model has already been charged. When the charge has not been completed, the controller 37 may display that the vehicle model cannot be selected because it has not been charged, that the payment is required, and the like and guide the user to the charge screen. Further, the controller 37 may shift the process to Step S1 when the charge for the vehicle model is not performed.

After Step S6, the controller 37 determines whether or not the pseudo sound data set of the vehicle model has already been downloaded (S7). When the pseudo sound data set has not been downloaded (S7: NO), a request including information on the vehicle model is transmitted to the server 2 (S8).

After that, the controller 37 determines whether or not there is a response from the server 2 (S9). When there is no response from the server 2 (S9: NO), the controller 37 repeats Step S9 and enters the standby state. On the other hand, when there is a response from the server 2 (S9: YES), the controller 37 stores data such as a pseudo sound data set included in the response and an in-vehicle device image displayed on the pseudo sound playback screen in the storage unit 34 (S10).

In Step S7, when the pseudo sound data set has already been downloaded (S7: YES), or after Step S10, the controller 37 shifts the screen displayed on the display unit 32 from the vehicle model selection screen (see FIG. 2) to the pseudo sound playback screen (see FIG. 4) (S11). Then, the controller 37 executes a pseudo sound playback process (S12). The pseudo sound playback process will be described with reference to FIG. 10.

Figure 10:
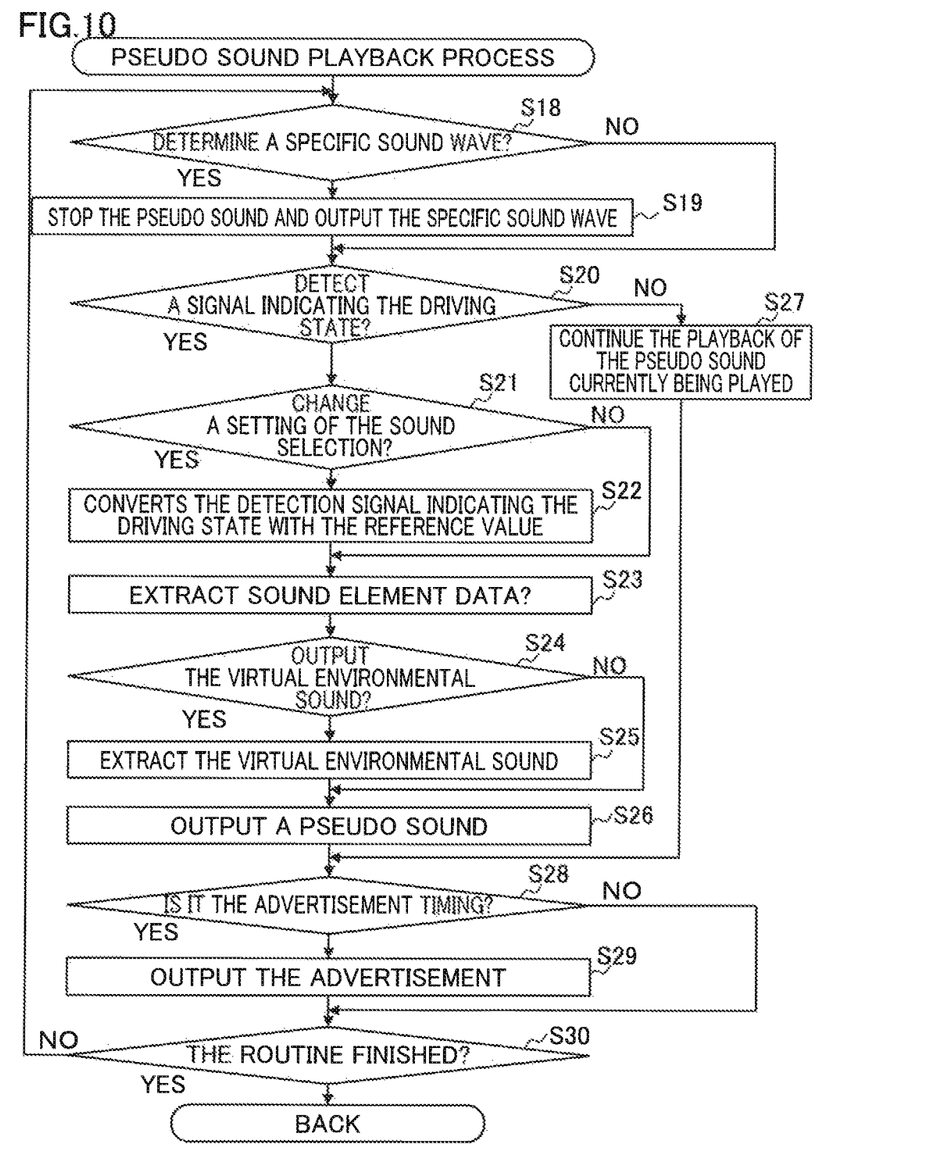
FIG. 10 is a flowchart of a pseudo sound playback process.

Next, a flowchart of the pseudo sound playback process, which is a subroutine of the main process, will be described with reference to FIG. 10. First, the controller 37 determines whether or not a specific sound wave having a volume equal to or higher than a predetermined value, for example, sirens of emergency vehicles such as ambulances, fire engines, and police cars, sounds generated by large vehicles, and sound waves such as accidents between vehicles, has been acquired by the environmental sound acquisition unit 38 (S18). When the specific sound wave is acquired (S18: YES), the controller 37 stops the pseudo sound including the playback sound element and the virtual environmental sound and outputs the specific sound wave in the vehicle until the specific sound wave is not acquired (S19).

When the specific sound wave is not acquired in Step S18 (S18: NO), or after Step S19, it is determined whether or not the detection signal indicating the driving state from the detection unit 35 is received (S20). When the driving state is detected (S20: YES), the controller 37 determines whether or not the sound selection reference has been changed by the setting (S21). That is, when "1×" is selected on the setting screen (see FIG. 3), the sound selection reference is not changed, and when any other value (for example, "1.5×" or "2×") is selected by the slider bar, the sound selection reference is changed. When the sound selection reference is changed (S21: YES), the controller 37 converts the detection signal indicating the driving state acquired by the detection unit 35 with the reference value (S22). For example, when the driving state is 50 km and the reference value is "1.5×", it will be converted into a signal indicating "75 km".

After Step S22, or when the sound selection reference has not changed (S21: NO), the controller 37 refers to the pseudo sound data set table stored in the storage unit 34 as a lookup table and extracts sound element data (S23). Then, the controller 37 determines whether or not to output the virtual environmental sound (S24). When the virtual environmental sound is output (S24: YES), the controller 37 refers to the virtual environmental sound table downloaded from the server 2 and stored in the storage unit 34 as a lookup table and extracts the virtual environmental sound (S25). That is, on the setting screen (see FIG. 3), the turned-on virtual environmental sound (sound data of wind noise, tire running sound, and brake noise) is extracted.

After Step S25, or when the virtual environmental sound is not output (S24: NO), the controller 37 outputs a pseudo sound (S26). The pseudo sound includes a sound element and includes a virtual environmental sound when the virtual environmental sound is output. When the driving state is not detected in Step S20 (S20), the playback of the pseudo sound currently being played is continued (S27).

After Step S26 or Step S27, the controller 37 determines whether or not it is the advertisement timing (S27). The advertisement timing may be set after a predetermined time has elapsed from the start of the pseudo sound playback process or the previous advertisement timing. When it is the advertisement timing (S28: YES), the controller 37 outputs the advertisement (S29). As the output mode of the advertisement, the advertisement may be displayed on the display unit 32, or the output of the pseudo sound may be temporarily stopped and the advertisement may be output by voice.

After Step S28, or when it is not the advertisement timing in Step S27 (S27: NO), the controller 37 determines whether or not to finish this routine. Whether or not to finish may be determined by whether or not the user has made an input indicating termination to the input unit 33, whether or not it has been detected that the engine has been stopped, and the like. When it does not end (S29: NO), the controller 37 shifts the process to Step S18. On the other hand, when finishing, the process of this routine is terminated and the process is returned to the main process.

Although the embodiment of the invention have been described above, only specific example is illustrated and the invention is not particularly limited, and further specific configurations of each part and the like can be appropriately redesigned. Moreover, the effects described in the embodiment of the invention merely list the most preferable effects arising from the invention and the effects of the invention are not limited to those described in the embodiment of the invention.

Moreover, in the above-described detailed description, the characteristic parts are mainly described so that the invention can be understood more easily. The invention is not limited to the embodiment described in the detailed description described above and can be applied to other embodiments, and the scope of application thereof is diverse. In addition, the terms and usages used in the present specification are used to accurately explain the invention and are not used to limit the interpretation of the invention. Further, those skilled in the art will find it easy to infer other configurations, systems, methods and the like included in the concept of the present invention from the concept of the invention described in the specification. Therefore, the description of the scope of claims must be regarded as including an equal configuration without departing from the scope of the technical idea of the invention. The purpose of the abstract is to enable engineers and others belonging to the Japan Patent Office, general public institutions, and technical fields who are not familiar with patents, legal terms, or technical terms to promptly determine the technical content and essence of the present application by a simple search. Therefore, the abstract is not intended to limit the scope of the invention to be evaluated by the statement of claims. Further, in order to fully understand the object of the invention and the peculiar effect of the invention, it is desired that the interpretation is made with full consideration of the documents and the like already disclosed.

The detailed description described above includes processing performed on the computer. The above explanations and expressions are described for the purpose of being understood by those skilled in the art most efficiently. In the specification, each process used to derive one result should be understood as a self-consistent process. Further, in each process, transmission reception, recording, and the like of an electric or magnetic signal are performed. In the processing in each process, such signals are represented by bits, values, symbols, letters, terms, numbers, and the like, but these are used merely for convenience of explanation. In addition, the processing in each process may be described in terms common to human behavior, but the processing described in the specification is, in principle, executed by various devices. In addition, other configurations required to perform each process are self-evident from the above description.

What is claimed is:

1. A pseudo driving sound playback system comprising:
a server; and
an in-vehicle device, wherein
the server includes,
a database which stores a plurality of pseudo sound data sets in which sound elements of engine sound are associated with each of a plurality of predefined driving states for each of a plurality of passenger gasoline vehicle models,
the in-vehicle device includes,
a communication unit which performs data communication with the server,
a display unit,
an input unit which accepts input from a user,
a storage unit,
a detection unit which continuously detects the driving state of a passenger car equipped with the in-vehicle device,
a sound output unit which outputs the sound element to the inside of the passenger car, and
a controller, and
the controller
determines any one of the plurality of vehicle models based on the input of the user received by the input unit,
requests the determined vehicle model to the server via the communication unit,
downloads a pseudo sound data set corresponding to the vehicle model from the server as a response to the request and stores the pseudo sound data set in the storage unit,
selects the sound element according to the driving state detected by the detection unit from the pseudo sound data set and sequentially outputs the sound element as sound from the sound output unit,
generates virtual environmental sound corresponding to the detected driving state and outputs the virtual environmental sound to the inside of the vehicle, and
switches on/off of output of the virtual environmental sound according to setting.

2. A pseudo driving sound playback system comprising:
a server; and
an in-vehicle device, wherein
the server includes,
a database which stores a plurality of pseudo sound data sets in which sound elements of engine sound are associated with each of a plurality of predefined driving states for each of a plurality of passenger gasoline vehicle models,
the in-vehicle device includes,
a communication unit which performs data communication with the server,
a display unit,
an input unit which accepts input from a user,
a storage unit,
a detection unit which continuously detects the driving state of a passenger car equipped with the in-vehicle device,
a sound output unit which outputs the sound element to the inside of the passenger car, and
a controller, and
the controller
determines any one of the plurality of vehicle models based on the input of the user received by the input unit,
requests the determined vehicle model to the server via the communication unit,
downloads a pseudo sound data set corresponding to the vehicle model from the server as a response to the request and stores the pseudo sound data set in the storage unit, and
selects the sound element according to the driving state detected by the detection unit from the pseudo sound data set and sequentially outputs the sound element as sound from the sound output unit, and the controller displays an image imitating an in-vehicle device actually mounted on the determined vehicle model on the display unit after the vehicle model is determined.

3. A pseudo driving sound playback system comprising:
a server; and
an in-vehicle device, wherein
the server includes,
a database which stores a plurality of pseudo sound data sets in which sound elements of engine sound are associated with each of a plurality of predefined driving states for each of a plurality of passenger gasoline vehicle models,
the in-vehicle device includes,
a communication unit which performs data communication with the server,
a display unit,
an input unit which accepts input from a user,
a storage unit,
a detection unit which continuously detects the driving state of a passenger car equipped with the in-vehicle device,
a sound output unit which outputs the sound element to the inside of the passenger car and
a controller, and
the controller
determines any one of the plurality of vehicle models based on the input of the user received by the input unit,
requests the determined vehicle model to the server via the communication unit,
downloads a pseudo sound data set corresponding to the vehicle model from the server as a response to the request and stores the pseudo sound data set in the storage unit, and
selects the sound element according to the driving state detected by the detection unit from the pseudo sound data set and sequentially outputs the sound element as sound from the sound output unit, and
allows selection of the vehicle model by charging.

4. The pseudo driving sound playback system according to claim 3, wherein
the controller displays a vehicle model selection screen in which vehicle model information is displayed for each of the plurality of vehicle models on the display unit, and after selecting the vehicle model, outputs advertisement information of the manufacturer of the vehicle model as an alternative to the charging.

5. The pseudo driving sound playback system according to claim 2, wherein
the controller changes standard of the sound element to be selected with respect to the detected driving state according to setting.

6. The pseudo driving sound playback system according to claim 2, wherein
the in-vehicle device further includes an environmental sound acquisition unit which acquires environmental sound generated outside the passenger car, and
the controller outputs the environmental sound into the vehicle.

7. The pseudo driving sound playback system according to claim 2, wherein
the controller generates virtual environmental sound corresponding to the detected driving state and outputs the virtual environmental sound to the inside of the vehicle.

8. The pseudo driving sound playback system according to claim 3, wherein
the controller changes standard of the sound element to be selected with respect to the detected driving state according to setting.

9. The pseudo driving sound playback system according to claim 3, wherein
the in-vehicle device further includes an environmental sound acquisition unit which acquires environmental sound generated outside the passenger car, and
the controller outputs the environmental sound into the vehicle.

10. The pseudo driving sound playback system according to claim 3, wherein
the controller generates virtual environmental sound corresponding to the detected driving state and outputs the virtual environmental sound to the inside of the vehicle.

11. The pseudo driving sound playback system according to claim 4, wherein
the controller changes standard of the sound element to be selected with respect to the detected driving state according to setting.

12. The pseudo driving sound playback system according to claim 3, wherein
the in-vehicle device further includes an environmental sound acquisition unit which acquires environmental sound generated outside the passenger car, and
the controller outputs the environmental sound into the vehicle.

13. The pseudo driving sound playback system according to claim 3, wherein
the controller generates virtual environmental sound corresponding to the detected driving state and outputs the virtual environmental sound to the inside of the vehicle.

\* \* \* \* \*